United States Patent [19]
Retallick

[11] Patent Number: 5,048,299
[45] Date of Patent: * Sep. 17, 1991

[54] AIR CONDITIONER FOR AN AUTOMOBILE

[76] Inventor: William B. Retallick, 1432 Johnny's Way, West Chester, Pa. 19382

[*] Notice: The portion of the term of this patent subsequent to Jul. 10, 2007 has been disclaimed.

[21] Appl. No.: 539,237

[22] Filed: Jun. 18, 1990

Related U.S. Application Data

[63] Continuation-in-part of Ser. No. 426,009, Oct. 24, 1989, Pat. No. 4,939,902.

[51] Int. Cl.$^5$ .............................................. F17C 11/00
[52] U.S. Cl. ........................................ 62/46.2; 62/244
[58] Field of Search .................................. 62/46.2, 244

[56] References Cited

U.S. PATENT DOCUMENTS

| | | | |
|---|---|---|---|
| 4,161,211 | 7/1979 | Duffy et al. | 62/46.2 |
| 4,178,987 | 12/1979 | Bowman et al. | 62/46.2 |
| 4,385,726 | 5/1983 | Bernauer et al. | 62/46.2 |
| 4,402,187 | 9/1983 | Golben et al. | 62/46.2 |
| 4,599,867 | 7/1986 | Retallick | 62/46.2 |
| 4,799,360 | 1/1989 | Retallick | 62/46.2 |

Primary Examiner—Ronald C. Capossela
Attorney, Agent, or Firm—William H. Eilberg

[57] ABSTRACT

An air conditioner for an automobile includes two pairs of hydrogen storage cells. Each cell includes a hydride-forming material, which absorbs hydrogen while generating heat, and releases hydrogen while absorbing heat. One pair of cells operates as an air conditioner, absorbing heat from the interior of the automobile and discharging heat to the outside. The other pair of cells, is regenerated by supplying heat from the engine exhaust to one of the cells, while allowing heat generated at the other cell of the pair to be discharged to the outside. After a given pair of cells has been regenerated, the cells are cooled to approach the temperature at which they will again operate as an air conditioner. A system of valves is arranged to provide four distinct stage. In Stage 1, the first cell pair is an air conditioner while the second cell pair is being regenerated. In Stage 2, the second cell pair is cooled. In Stage 3, the second cell pair is an air conditioner while the first cell pair is being regenerated. In Stage 4, the first cell pair is cooled. Cooling of the cell pairs reduces the parasitic cooling load which would otherwise reduce the efficiency of the apparatus. The cooling step includes the step of causing a heat transfer medium to circulate between the first cell of the first pair and the first cell of the second pair.

17 Claims, 4 Drawing Sheets

AIR CONDITIONER FOR AN AUTOMOBILE

CROSS-REFERENCE TO PRIOR APPLICATION

This is a continuation-in-part of U.S. patent application Ser. No. 07/426,009, filed October 24, 1989, entitled "Air Conditioner for an Automobile", now U.S. Pat. No. 4,939,903.

BACKGROUND OF THE INVENTION

This invention relates to a heat pump for cooling an automobile. The heat pump is driven by waste heat from the engine. The present invention eliminates the need for a compressor. In conventional air conditioners, a compressor consumes a significant part of the engine horsepower. The present invention also eliminates the need for chlorofluorocarbons, which destroy ozone in the upper atmosphere.

A typical heat load for an automobile air conditioner is 12,000 BTU per hour. It takes about 18,000 BTU per hour to drive the heat pump of the present invention. A typical engine produces about 11 pounds of exhaust gas at 500° C. per horsepower-hour. Thus, if the engine is operating at 20 horsepower, and the gas is cooled by 200°C., the amount of heat produced by the engine, per hour, is (20 hp)(11 lb/hp/hr)(200° C.)(0.45 Btu/lb/°C.), where 0.45 Btu/lb/°C. is the specific heat of air. The above expression equals 19,800 Btu per hour, which is sufficient to drive the heat pump.

An essential component of the heat pump of the present invention is the hydrogen storage cell described in U.S. Pat. No. 4,599,867. The cell comprises a nest of metal fins that are traversed by tubes that carry a heat transfer fluid. The fins are coated with a metal hydride or with a metal capable of forming a hydride. Also essential to this heat pump is U.S. Pat. No. 4,799,360, entitled "Method of Binding a Metal Hydride to a Surface". The disclosures of the above-cited patents are incorporated by reference herein.

The present invention is an improvement over the apparatus described in my U.S. Pat. No. 4,939,902. In the apparatus shown in the latter application, the hydrides cycle between the temperature at which a cell does the cooling and the temperature at which the cell is regenerated. The problem resides in reducing the temperature of the hydride from the regeneration to the cooling temperature. Whatever part of this cooling is done by evolving hydrogen from the hydride is parasitic cooling that lowers the efficiency of the device. The present invention provides an air conditioner which can reduce the parasitic cooling by as much as a factor of two.

SUMMARY OF THE INVENTION

In the preferred embodiment, the present invention includes two pairs of hydrogen storage cells. All of the cells are substantially identical, and can be constructed according to the teachings of the above-cited patents. The cells are connected, in a manner to be described, with first, second, and third heat exchangers. The first heat exchanger absorbs heat from the interior of the automobile. The second heat exchanger rejects heat to the ambient air outside of the automobile. The third heat exchanger absorbs heat generated by the engine. A heat transfer fluid circulates between the cells and the heat exchangers. There is also a hydrogen conduit connecting the two cells of each pair.

The invention also includes an arrangement of valves for routing the flow of heat transfer fluid between the heat exchangers and the hydrogen storage cells, in each of four stages. The connections are made as follows:

|  | First Exchanger | Second Exchanger | Third Exchanger |
| --- | --- | --- | --- |
| Stage 1 | First cell of the first pair | Second cell of the first pair, and first cell of the second pair | Second cell of the second pair |
| Stage 2 |  | Second cell of the second pair |  |
| Stage 3 | First cell of the second pair | Second cell of the second pair, and first cell of the first pair | Second cell of the first pair |
| Stage 4 |  | Second cell of the first pair |  |

Also, during Stages 2 and 4, the valves are connected such that fluid circulates between the two first cells, thereby tending to equalize the temperatures in the two first cells.

The operation of the apparatus is summarized as follows. In Stage 1, the first exchanger absorbs heat from the interior of the automobile, and this heat is conveyed to the first cell of the first pair of cells. When the cell absorbs heat, it releases hydrogen, and this hydrogen is conveyed to the second cell of the first pair of cells. The hydrogen is absorbed by this second cell, which generates heat, and this heat is discharged to the outside by the second heat exchanger.

While the first cell pair is operating as an air conditioner, in Stage 1, the second cell pair is being regenerated. Heat from the engine exhaust is absorbed by the third heat exchanger, which conveys this heat to the second cell of the second pair of cells. This second cell releases hydrogen which is conveyed to the first cell of the second pair of cells. The latter cell absorbs the hydrogen, releasing heat, and this heat is discharged to the outside by the second heat exchanger.

In Stage 2, heat transfer fluid is circulated between the first cells of the two pairs, thereby cooling the first cell of the second pair, which was previously being regenerated. At the same time, the second cell of the second pair is cooled by the second heat exchanger.

In Stage 3, the second cell pair is connected to perform the air conditioning and the first cell pair is regenerated, in a manner which corresponds to Stage 1.

In Stage 4, heat transfer fluid is again circulated between the first cells of the two pairs, while the second cell of the first pair is cooled by the second heat exchanger.

Each stage represents a distinct setting of valves. The apparatus is programmed to operate successively in Stage 1, Stage 2, Stage 3, Stage 4, Stage 1, and so forth. The apparatus remains in each stage for a predetermined interval. Preferably, the intervals for Stages 2 and 4 are shorter than those of Stages 1 and 3.

It is therefore an object of the invention to provide an air conditioner for an automobile, in which the air conditioner uses the principle of hydriding and dehydriding to pump the heat.

It is another object to provide an air conditioner for an automobile that is driven by waste heat in the exhaust gas.

It is another object to provide an air conditioner for an automobile, wherein the air conditioner includes two pairs of hydrogen storage cells, and wherein one pair can be regenerated while the other pair is operating as an air conditioner.

It is another object to provide a heat pump that can be driven by waste heat from any source.

It is another object to provide a heat pump that is compact.

It is another object to reduce the parasitic cooling inherent in a heat pump, by cooling the cells which have been regenerated.

It is another object to enhance the efficiency of an air conditioner for an automobile.

Other objects and advantages of the invention will be apparent to those skilled in the art, from a reading of the following brief description of the drawings, the detailed description of the invention, and the appended claims.

DETAILED DESCRIPTION OF THE INVENTION

Figure 1:
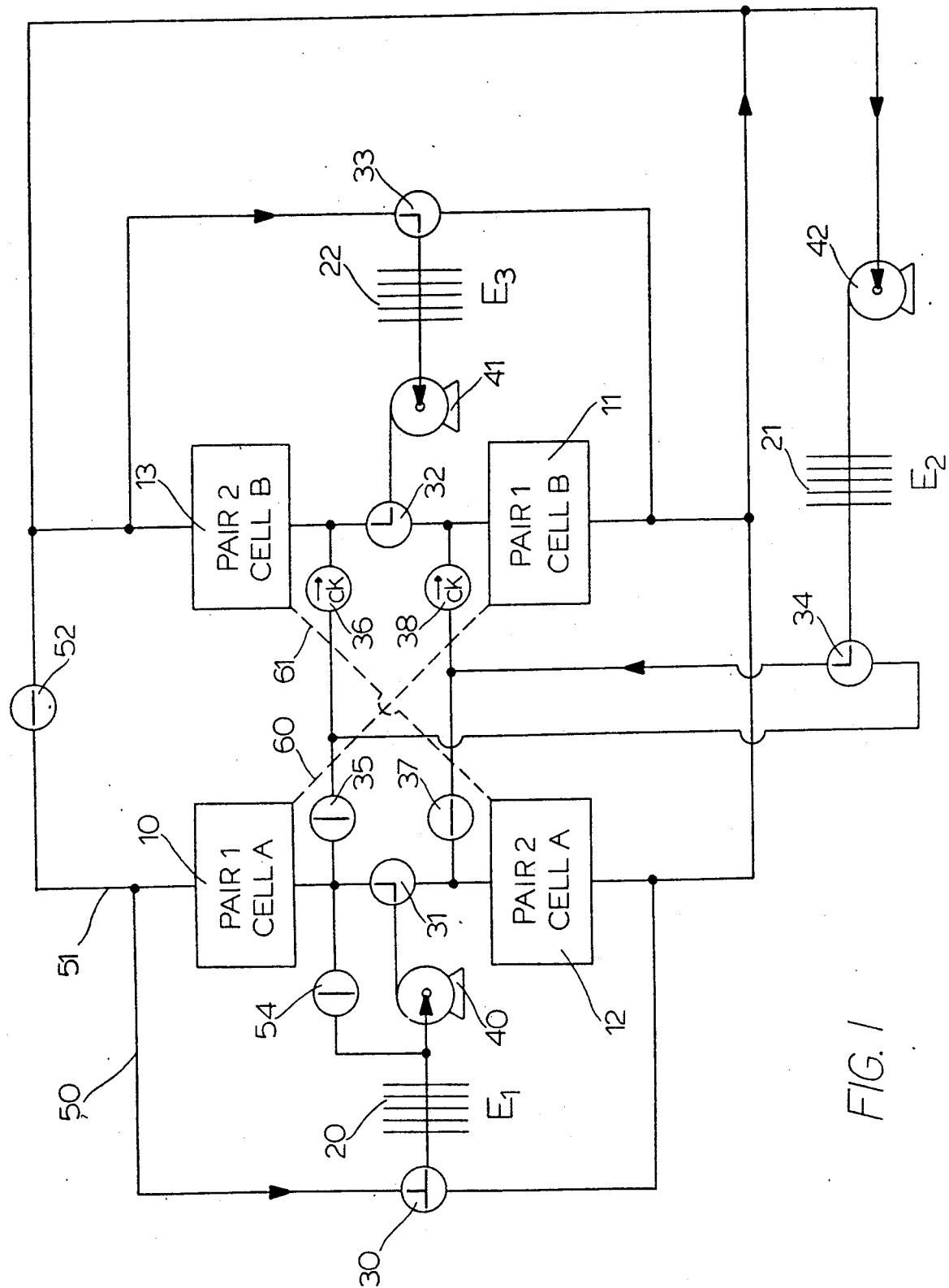
FIG. 1 is a schematic diagram showing the essential components of the invention, wherein the valves are set for Stage 1, as described herein.

When a metal absorbs hydrogen to form a hydride, heat is evolved. Conversely, when the hydride evolves its hydrogen, heat is absorbed. A metal hydride heat pump requires two hydrides. If the hydrides are at the same temperature, one of the hydrides must exert a higher pressure of hydrogen than the other hydride. Conversely, for a hydride at a given temperature, there exists another temperature, different from the first, such that another hydride operating at this second temperature will exert the same pressure as the first. Thus, the high-pressure hydride can evolve hydrogen at a low temperature, and absorb heat, while the evolved hydrogen is being absorbed by the low-pressure hydride at some higher temperature, where the heat is being rejected. In the present case, the lower temperature is somewhat below that inside the automobile, and the higher temperature is somewhat above that of the air outside the automobile.

A pair of hydrogen storage cells therefore can function as an air conditioner, as follows. One of the cells absorbs heat from the interior of the automobile, thereby giving off hydrogen. The evolved hydrogen is absorbed by the other cell, thereby causing that cell to release heat. If the heat given off by the second cell is discharged to the outside, there is a net transfer of heat from the interior to the exterior of the automobile.

In the arrangement described above, the hydrogen must periodically be evolved from the second hydride and reabsorbed into the first hydride. This process is called regeneration. Regeneration must be driven by heat available at a temperature above that of the ambient air. In the present invention, the engine exhaust is the source of this high temperature heat. To accomplish regeneration, the second hydride is heated, indirectly, by the engine exhaust, and the first hydride is cooled, indirectly, by the ambient air.

To provide continuous cooling, it is necessary to have first and second pairs of hydrogen storage cells. One pair performs the cooling while the other pair is being regenerated. In the ideal case, heat is being absorbed continuously from the air inside the automobile, continuously rejected to the outside air, and continuously absorbed from the exhaust. The heat transfer is accomplished most efficiently by providing first, second, and third heat exchangers, one for each heat transfer task. Each exchanger operates at a constant temperature, so that it does not impose a parasitic cooling load when the hydrogen storage cells alternate between cooling and regeneration. It is only necessary to reroute the flow when the cells switch from cooling to regenerating.

In actuality, there is a loss of efficiency due to the fact that the cells being regenerated are at a higher temperature than the cells doing the cooling. Eventually, the cells that have been regenerated must be cooled. The cooling of these cells imposes a parasitic heat load on the system, and reduces the efficiency of the air conditioner. The present invention addresses this problem of parasitic cooling by providing means for cooling the cells that have just been regenerated, before they are used again as an air conditioner. These cooling means include two separate cooling loops. The first loop connects the two first cells of the two pairs, enabling a heat transfer fluid to flow between these cells. The second loop connects the second cell of the pair that has been regenerated to one of the heat exchangers, enabling the latter cell to be cooled.

FIG. 1 shows the essential components of the invention in schematic form. There are four hydrogen storage cells, identified by reference numerals 10, 11, 12, and 13. Cells 10 and 11 form the first pair of cells, and cells 12 and 13 form the second pair. Cells 10 and 11 are connected by a hydrogen conduit, represented symbolically by dotted line 60. Cells 12 and 13 are similarly connected by a hydrogen conduit represented by dotted line 61. The construction of all of the hydrogen storage cells can be as described in U.S. Pat. No. 4,599,867.

Cells 10 and 12 are designated as the first cells of their respective pairs; cells 11 and 13 are the second cells of their pairs. In the figures, the pairs are identified by numbers (e.g. "Pair 1") and the cells within a pair are identified by letters (e.g. "Cell A").

There are three heat exchangers 20, 21, and 22. Exchanger 20 absorbs heat from the air inside the automobile. Exchanger 21 rejects heat to the outside air. Exchanger 22 absorbs heat from the engine exhaust. These exchangers can be of the type resembling automobile radiators, i.e. a nest of fins traversed by heat transfer tubes, but are not limited to a particular structure.

The apparatus is cycled through four stages, designated as Stage 1, Stage 2, Stage 3, and Stage 4. Each stage is defined by a distinct setting of valves, as described below. FIGS. 1-4 show the valves in the positions defining Stages 1-4, respectively. In these figures, similar reference numerals denote similar components. The only differences between the figures are in the settings of the valves.

There are eleven valves, designated by reference numerals 30, 31, 32, 33, 34, 35, 36, 37, 38, 52, and 54, for routing the flow of the heat transfer fluid. Two of these are check valves 36 and 38, which permit the fluid to flow in only one direction. Valve 30 is a three-way valve which connects three fluid ports in the manner indicated by its symbol. Valves 31-34 are two-way valves which connect two fluid ports, also in the manner indicated by their symbols. Valves 35, 37, 52, and 54 are simple two-position valves which can be either open or closed. There are also three pumps 40, 41, and 42 for circulating the heat transfer fluid.

In Stage 1, which is the interval of time captured in FIG. 1, the cells and exchangers are connected as follows:
Cell 10 with exchanger 20
Cell 11 with exchanger 21
Cell 12 with exchanger 21
Cell 13 with exchanger 22

During this time interval, heat from the interior of the automobile is absorbed by exchanger 20, and transferred to cell 10. Cell 10 absorbs this heat and gives off hydrogen. The hydrogen is conveyed to cell 11, the second cell of the pair. Cell 11 absorbs the hydrogen while releasing heat, and this heat is conveyed to exchanger 21, which transfers the heat to the outside. Thus, cells 10 and 11, the first cell pair, function as an air conditioner.

At the same time, cells 12 and 13, the second cell pair, are being regenerated. Heat from the engine exhaust is absorbed by exchanger 22 and transferred to cell 13, the second cell of the second pair of cells. When heat is applied to cell 13, the cell gives off hydrogen, which is conveyed to cell 12, the first cell of the pair. Cell 12 absorbs the hydrogen, and gives off heat, and this heat is conveyed to exchanger 21, which transfers the heat to the outside.

Figure 2:
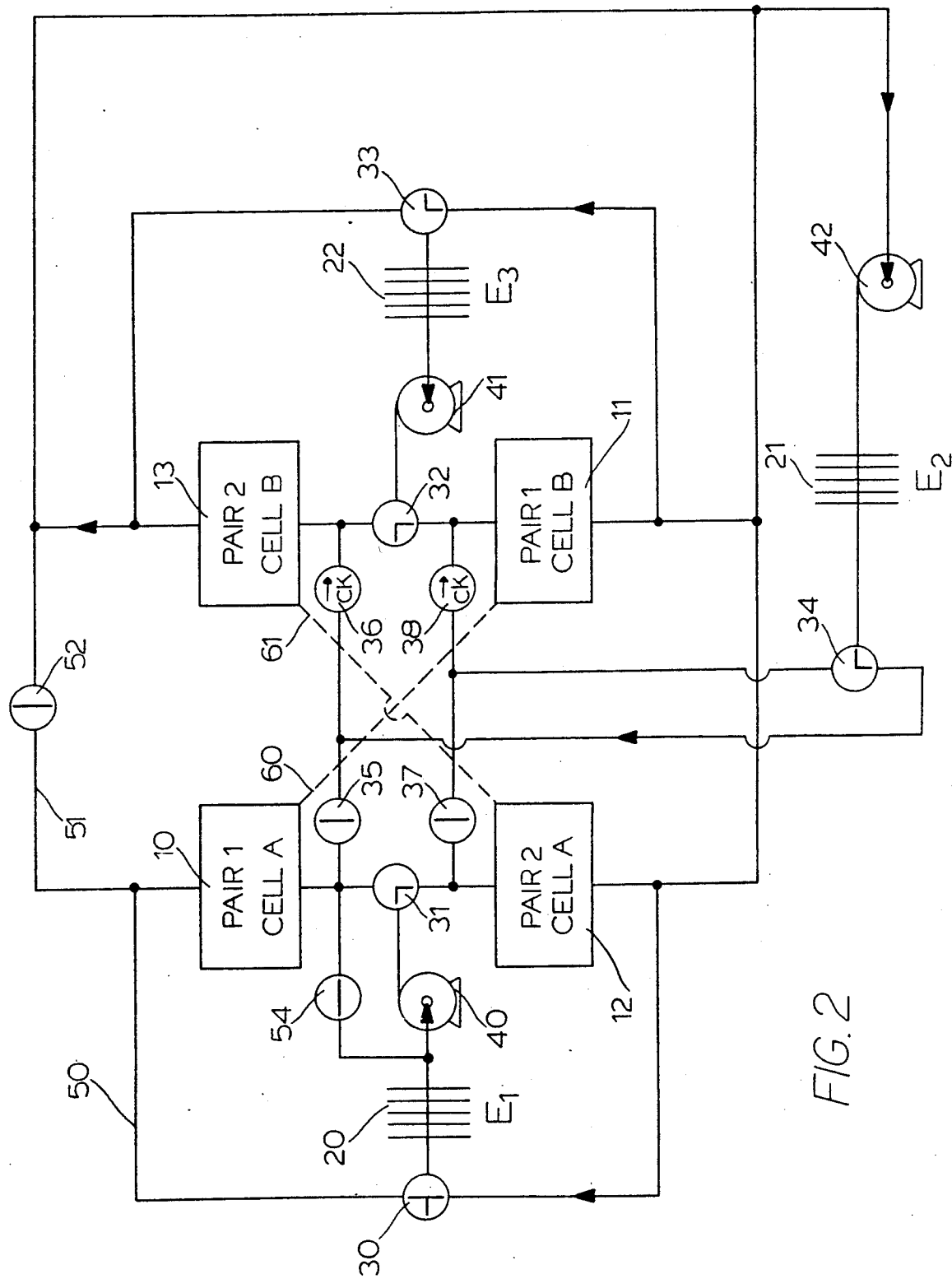
FIG. 2 is a schematic diagram, similar to FIG. 1, showing the valves set for Stage 2.

During the next interval of time, which is Stage 2, shown in FIG. 2, the positions of the valves are changed so that heat transfer fluid circulates between cells 10 and 12, and so that cell 13 is cooled by exchanger 21. More specifically, heat transfer fluid from cell 10 flows through valve 54, through pump 40 and valve 31, through cell 12, through valve 30, and back to cell 10. The settings of valves 52, 35, and 37 prevent the fluid from flowing outside of this path. Thus, during Stage 2, the temperatures of cells 10 and 12 approach each other.

Figure 3:
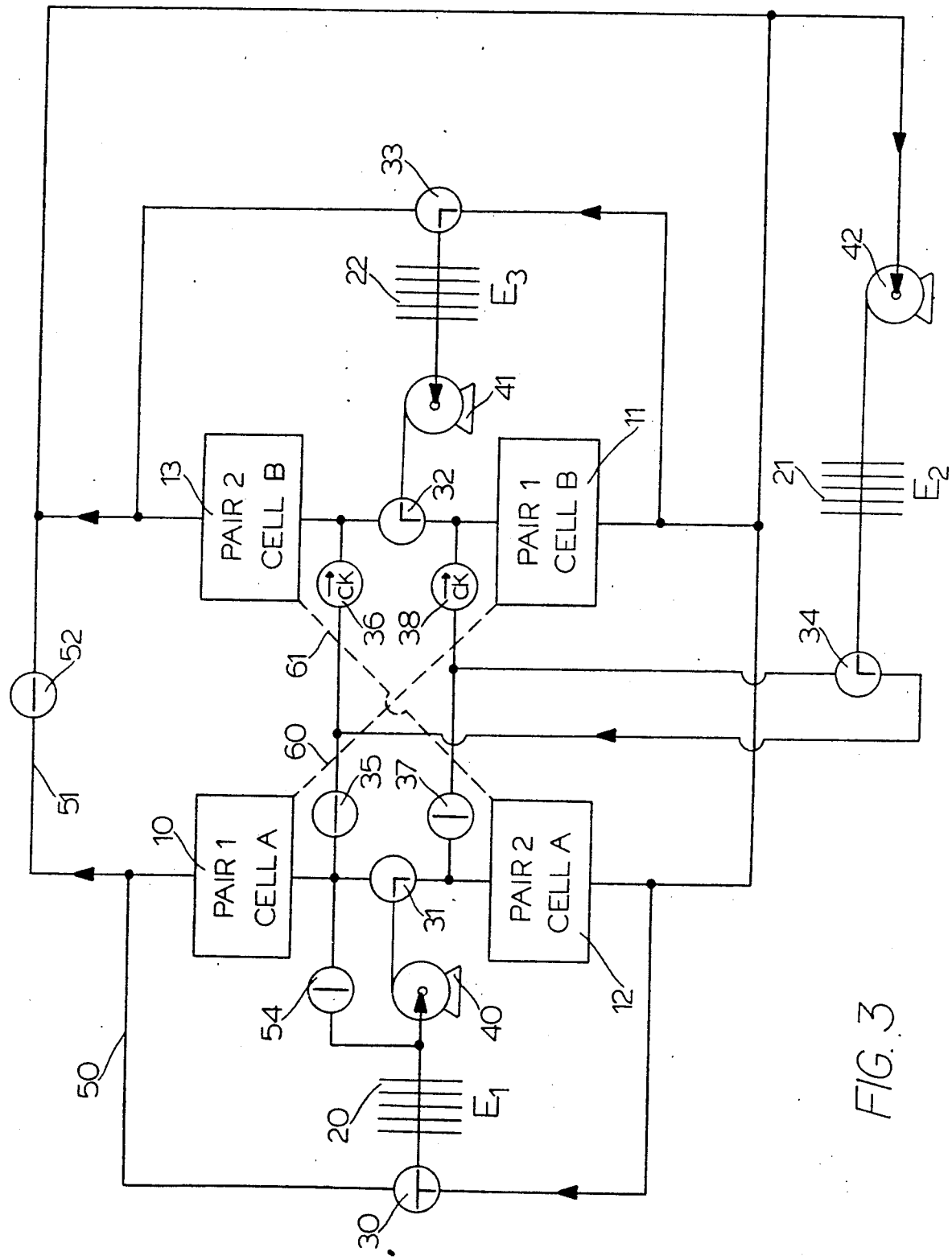
FIG. 3 is a schematic diagram, similar to FIG. 1, showing the valves set for Stage 3.

During the next interval of time, which is Stage 3, shown in FIG. 3, the cells and exchangers are connected in this way:
Cell 10 with exchanger 21
Cell 11 with exchanger 22
Cell 12 with exchanger 20
Cell 13 with exchanger 21

In the valve position shown in FIG. 3, heat from the automobile interior is absorbed by exchanger 20 and conveyed to cell 12. This heat is absorbed by cell 12, which generates hydrogen. The hydrogen is conveyed to cell 13, which absorbs the hydrogen, and gives off heat. This heat is discharged to the outside, through exchanger 21.

At the same time, as shown in FIG. 3, heat from the automobile exhaust is absorbed by exchanger 22, and conveyed to cell 11. This heat is absorbed by cell 11, which gives off hydrogen, and the hydrogen is carried to cell 10. Cell 10 absorbs the hydrogen, and gives off heat which is discharged to the outside through exchanger 21.

Thus, in FIG. 3, cells 12 and 13 comprise the pair which is doing the cooling, and cells 10 and 11 comprise the pair which is being regenerated.

Figure 4:
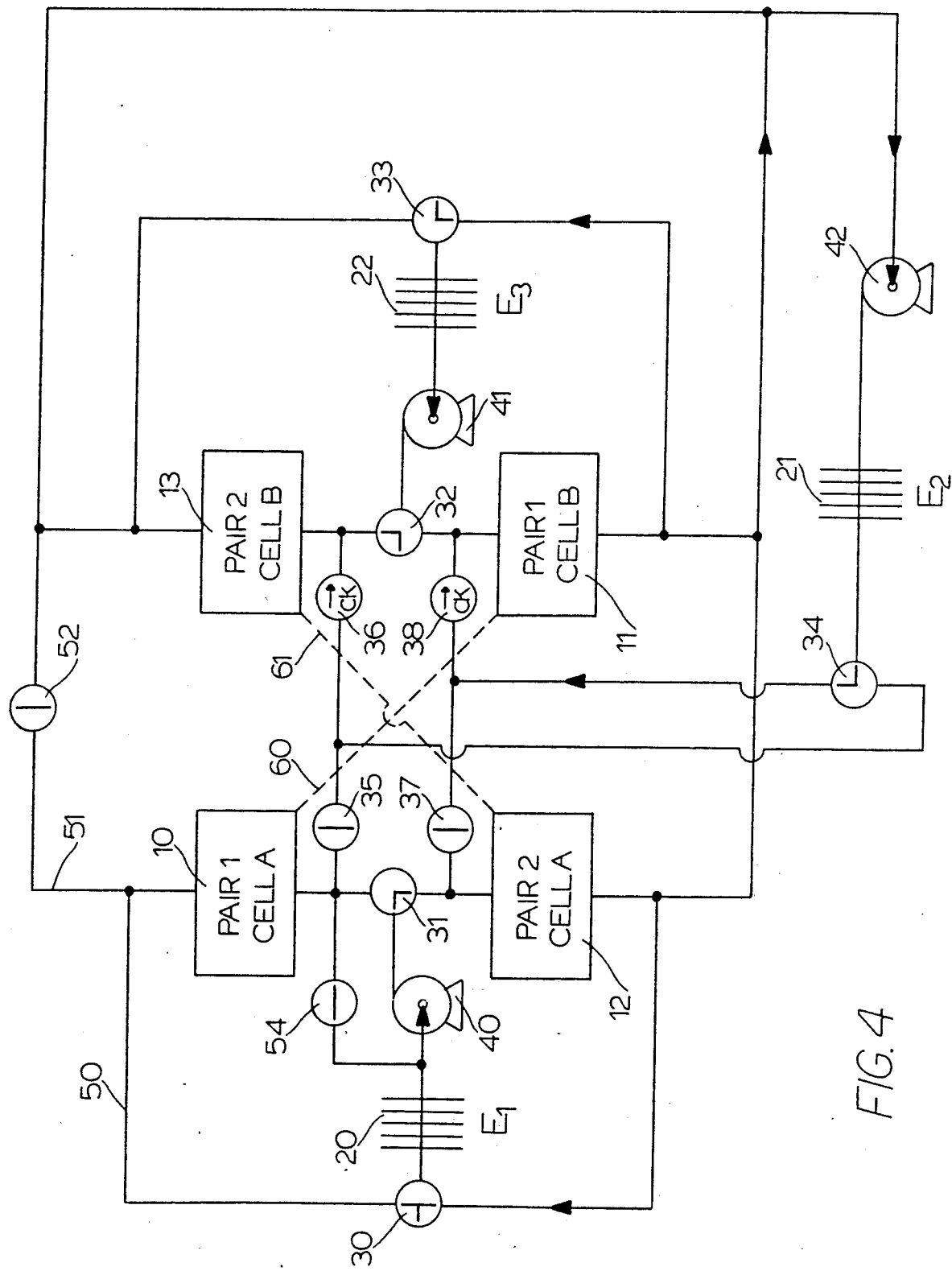
FIG. 4 is a schematic diagram, similar to FIG. 1, showing the valves set for Stage 4.

During the next interval of time, which is Stage 4, shown in FIG. 4, the positions of the valves are changed so that heat transfer fluid circulates between cells 10 and 12, and so that cell 11 is cooled by exchanger 21. As in Stage 2, heat transfer fluid from cell 10 flows through valve 54, through pump 40 and valve 31, through cell 12, through valve 30, and back to cell 10. The settings of valves 52, 35, and 37 again prevent the fluid from flowing outside of this path. As was true for Stage 2, the temperatures of cells 10 and 12 approach each other.

The valves are periodically switched from one position to the next. That is, the apparatus is programmed automatically to switch from Stage 1, to Stage 2, to Stage 3, to Stage 4, and back to Stage 1, and so forth. Thus, the cells which have just completed the regeneration process are cooled before they begin to function as an air conditioner. Note that, in U.S. Pat. No. 4,939,902, cited above, the second cell of each pair (either cell 11 or 13) is cooled by heat exchange with exchanger 21, during the air conditioning cycle. However, the cited application does not provide for cooling of the first cell of the pair (i.e. cell 10 or 12). Thus, one major difference between the present invention and that described in the cited application is the provision of a circulation loop for the heat transfer fluid between the two first cells of the two pairs, immediately following the regeneration step. It is this cooling loop which substantially reduces the parasitic cooling load.

The following considerations determine the relative lengths of the time intervals of Stages 1–4. By prolonging Stages 2 and 4, the temperatures of the two first cells (cells 10 and 12) approach each other more closely, and the parasitic heat loss becomes smaller. However, if the duration of Stages 2 and 4 approach the duration of Stages 1 and 3, the air conditioner will be cooling only about one-half of the time, and the required size of the apparatus would therefore double. A compromise must be made between efficiency and size, i.e. between reduction of the parasitic cooling and reduction of the time during which the apparatus is not functioning as an air conditioner. Therefore, the duration of Stages 2 and 4 should be shorter than that of Stages 1 and 3. For example, the duration of Stages 2 and 4 could be less than one-half the duration of Stages 1 and 3. In this discussion, it is assumed that the duration of Stages 1 and 3 are equal, and that the duration of Stages 2 and 4 are equal. The latter conditions are preferred, but not absolutely required.

The same heat transfer fluid circulates through all of the cells and exchangers shown in the figures. Advantageously, this is the same glycol-water mixture that is used for engine coolant. In one embodiment, hot coolant from the engine could be used to drive the heat pump.

It would be possible to reconstruct the apparatus so that each of the four cells has its own heat exchanger. The exchangers connected to cells 10 and 12 would alternate between being contacted with cool air inside the automobile and warm air outside the automobile. Cooling the mass of the exchanger also imposes a parasitic load on the heat pump. The exchangers connected to cells 11 and 13 would alternate between outside air and exhaust gas.

There are several reasons to prefer the arrangement shown in the figures:
1. There are three exchangers instead of four;
2. The parasitic load for cooling two exchangers is eliminated;
3. Only one exchanger must withstand hot, corrosive exhaust gas;
4. Each exchanger can be optimally sized to do just one task; and 5. Valves for routing heat transfer liquid are smaller and cheaper than valves for routing gases.

The valves shown in the figures prevent the mixing of liquids circulating at different temperatures. Consider the circuit of cell 10, exchanger 20, and pump 40, in FIG. 1. All of the liquid emerging from cell 10 must return to the circuit via line 50. There is only a small amount of in-out surge through line 51, during Stages 1 and 3, because the lines are completely filled with liquid, and because there is no return path for the liquid. The same applies to the circuit of cell 13, exchanger 22, and pump 41. And, no liquid can escape from the circuit that comprises cells 11 and 12 in parallel, pump 42, and exchanger 21. It is important to prevent warmer liquid from mixing with the cold liquid that is circulating through cell 10, because this would create parasitic heat load. Valves 35 and 37, and check valves 36 and 38 help to prevent this mixing.

In the position represented by FIG. 3, fluid flows in line 51, but does not flow from cells 11 and 12 towards pump 42, because there is again no return path for the fluid.

Note that each of the heat exchangers 20, 21, and 22 is operating at a constant temperature. If the heat exchangers were not at constant temperatures, one would need to expend energy to change the temperatures of the exchangers, and to do so would be wasteful.

This heat pump is not limited to cooling automobiles. Trucks, ships, and army tanks also need cooling. Some commercial buildings have waste heat that could drive a heat pump.

Although the invention has been described with respect to the particular embodiment shown, it is understood that other variations are possible. The invention is not limited by the types of valves, or by the specific construction of the hydrogen storage cells. As stated above, other circuit topologies could be used. These and other modifications should be deemed within the spirit and scope of the following claims.

What is claimed is:

1. Apparatus for air conditioning an automobile, the automobile having an engine, the apparatus comprising:
   a) first and second pairs of hydrogen storage cells, both cells of each pair containing a material capable of forming a hydride,
   b) first, second, and third heat exchangers, the first exchanger absorbing heat from the interior of the automobile, the second exchanger continuously rejecting heat to the ambient air outside of the automobile, the third exchanger absorbing heat generated by the engine,
   c) a heat transfer fluid that circulates between the hydrogen storage cells and the heat exchangers, and
   d) means for routing the flow of heat transfer fluid in accordance with four sequential stages, as follows:

|  | First Exchanger | Second Exchanger | Third Exchanger |
|---|---|---|---|
| Stage 1 | First cell of the first pair | Second cell of the first pair, and first cell of the second pair | Second cell of the second pair |
| Stage 2 |  | Second cell of the second pair |  |
| Stage 3 | First cell of the second pair | Second cell of the second pair, and first cell of the first pair | Second cell of the first pair |
| Stage 4 |  | Second cell of the first pair |  |

2. The apparatus of claim 1, wherein the third exchanger absorbs heat from the engine exhaust.

3. The apparatus of claim 1, wherein the third exchanger absorbs heat from the engine coolant.

4. The apparatus of claim 1, wherein the means for routing the flow of heat transfer fluid comprises a plurality of multiple-position multiple-way valves.

5. Apparatus for air conditioning an automobile, the automobile having an engine, the apparatus comprising:
   a) first and second pairs of hydrogen storage cells, each cell including a hydride-forming material, the members of each pair being connected to transfer hydrogen between said members,
   b) a first heat exchanger connected to absorb heat from the interior of the automobile, a second heat exchanger connected to discharge heat to the outside, and a third heat exchanger connected to absorb heat from the engine,
   c) conduit means for circulating a heat transfer medium among the cells and the heat exchangers, and
   d) valve means, disposed within the conduit means, for directing the flow of heat transfer medium to and from the heat exchangers, the valve means being configurable in four positions, wherein the first position permits one of the pairs of cells to operate as an air conditioner while the other pair is being regenerated, wherein the second position permits the pair which was previously regenerated to be cooled, wherein the third position permits the pair of cells previously regenerated to be used for air conditioning and the pair of cells previously used for air conditioning to be regenerated, and wherein the fourth position permits the pair which was previously regenerated to be cooled.

6. The apparatus of claim 5, wherein the valve means, when in the second and fourth positions, comprise means for circulating a heat transfer medium from the first cell of the first pair to the first cell of the second pair, and back.

7. Apparatus for air conditioning an automobile, the automobile having an engine, the apparatus comprising first and second pairs of hydrogen storage cells, each cell having a hydride-forming material, each pair of cells being connected so as to transfer hydrogen between members of the pair, means for directing heat from the interior of the automobile to the first cell of the first pair, means for discharging heat from the second cell of the first pair to the outside, means for directing heat from the engine to the second cell of the second pair, means for discharging heat from the first cell of the second pair, and means for switching the connections to the cells, such that the function previously performed by the first cell of the first pair is now performed by the first cell of the second pair, and such that the function previously performed by the second cell of the second pair is now performed by the second cell of the first pair, and means for interrupting the air-conditioning and regeneration functions and for cooling the pair of cells that has most recently been regenerated.

8. The apparatus of claim 7, wherein the cooling means includes means for circulating a heat transfer medium from the first cell of the first pair to the first cell of the second pair, and back.

9. A method of air conditioning an automobile, the automobile having an engine, the method comprising the steps of:
   a) directing heat from the interior of the automobile to the first of a first pair of hydrogen storage cells, the cells including a hydride forming material, the cells being connected for mutual exchange of hydrogen, thereby causing hydrogen to be released and to be conveyed to the second of the first pair of cells,
   b) removing heat from the second of the first pair of cells, and discharging said heat to the outside,
   c) directing heat from the engine to the second of a second pair of hydrogen storage cells, the second pair being substantially identical to the first pair, thereby causing hydrogen to be released and conveyed to the first cell of the second pair,
   d) removing heat from the first cell of the second pair, and discharging said heat to the outside, wherein steps (a) through (d) are performed simultaneously, and
   e) periodically switching the connections to the cells, such that steps (a) and (b) are performed with the second pair of cells and steps (c) and (d) are performed with the first pair of cells,
   f) wherein the switching step alternates with the step of cooling the cells which have most recently been regenerated.

10. The method of claim 9, wherein the cooling step includes the step of directing a heat transfer medium from the first cell of the first pair to the first cell of the second pair, and back.

11. The method of claim 9, wherein steps (a) through (d) are performed simultaneously for a first period of time, and wherein the cooling step is performed for a second period of time, and wherein the first and second periods are equal.

12. The method of claim 9, wherein steps (a) through (d) are performed simultaneously for a first period of time, and wherein the cooling step is performed for a second period of time, and wherein the second period is less than the first period.

13. The method of claim 9, wherein steps (a) through (d) are performed simultaneously for a first period of time, and wherein the cooling step is performed for a second period of time, and wherein the second period is less than about half the first period.

14. A method of air conditioning an automobile, the automobile having an engine, the method comprising the steps of providing two pairs of substantially identical hydrogen storage cells, the cells having a hydride-forming material, the cells of each pair being connected for exchange of hydrogen between members of the pair, directing heat from the interior of the automobile into the first cell of the first pair while discharging heat from the second cell of the first pair to the outside, directing heat from the engine into the second cell of the second pair while discharging heat from the first cell of the second pair to the outside, and periodically switching the connections to the cells such that the first directing and discharging steps are performed on the second pair and the second directing and discharging steps are performed on the first pair, wherein the switching step alternates with the step of cooling the cells which have most recently been regenerated.

15. The method of claim 14, wherein the cooling step comprises the step of directing a heat transfer medium from the first cell of the first pair to the first cell of the second pair, and back.

16. The method of claim 14, wherein the switching step is done such that one pair of cells operates as an air conditioner for a first interval of time, the other pair of cells being regenerating during said first interval, and such that the cooling step is performed for a second interval of time, and wherein the second interval is less than the first interval.

17. The method of claim 14, wherein the switching step is done such that one pair of cells operates as an air conditioner for a first interval of time, the other pair of cells being regenerating during said first interval, and such that the cooling step is performed for a second interval of time, and wherein the second interval is less than about half of the first interval.

* * * * *